United States Patent [19]

Sanford et al.

[11] 4,403,546

[45] Sep. 13, 1983

[54] PRINTING MECHANISM

[75] Inventors: Lyell G. Sanford; Leslie Ransom, both of Cincinnati, Ohio

[73] Assignee: General Signal Corporation, Stamford, Conn.

[21] Appl. No.: 199,910

[22] Filed: Oct. 20, 1980

[51] Int. Cl.[3] .......................... G06F 11/10; B41J 3/40

[52] U.S. Cl. .......................................... 101/79; 101/83

[58] Field of Search ...................... 101/59, 96, 95, 110, 101/75-77, 79-83, 85-89

[56] References Cited

U.S. PATENT DOCUMENTS

| | | | |
|---|---|---|---|
| 1,100,773 | 6/1914 | Perry | 101/83 |
| 2,723,719 | 11/1955 | Manlonya | 101/75 X |
| 3,107,606 | 10/1963 | Baratelli | 101/88 |
| 3,120,800 | 2/1964 | Ward | 101/79 X |
| 3,540,373 | 11/1970 | Dubs | 101/96 |
| 3,791,291 | 2/1974 | Macune | 101/80 X |
| 4,265,173 | 5/1981 | Takahaski | 101/79 |

*Primary Examiner*—A. J. Heinz

*Attorney, Agent, or Firm*—Pollock, Vande Sande & Priddy

[57] ABSTRACT

An improved imprinting mechanism is disclosed of the type particularly useful in document stamping machines which imprint on a document both the date and the time of receipt, and a serial number. A plurality of character wheels (30-58) is mounted for rotation on a shaft (28), each character wheel including a plurality of radially extending teeth (60, 64, 68, 72) on which the characters are located. Indexing rakes (108-116, 238-248) which engage slots located between the teeth of the character wheels to position the wheels for successive imprinting operations.

19 Claims, 18 Drawing Figures

FIG. 1
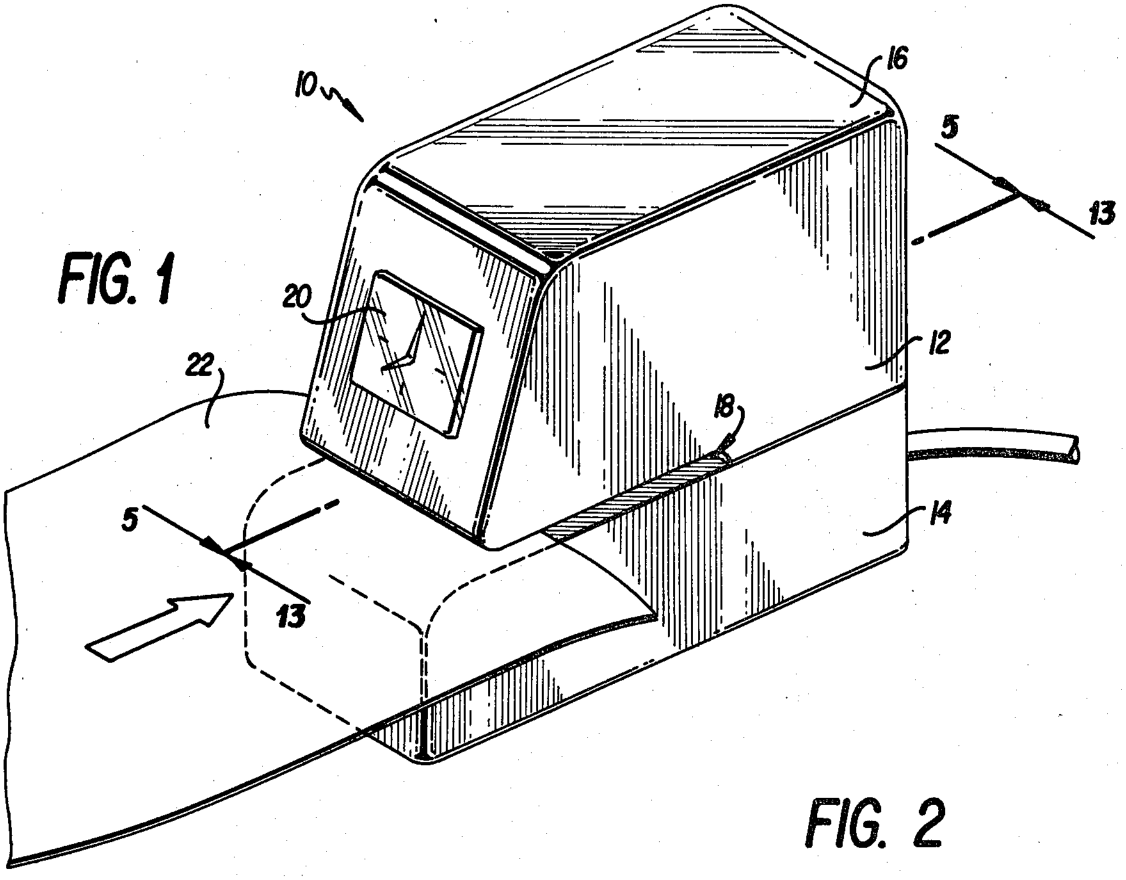
FIG. 2
JUN 80 29 02P37 001245
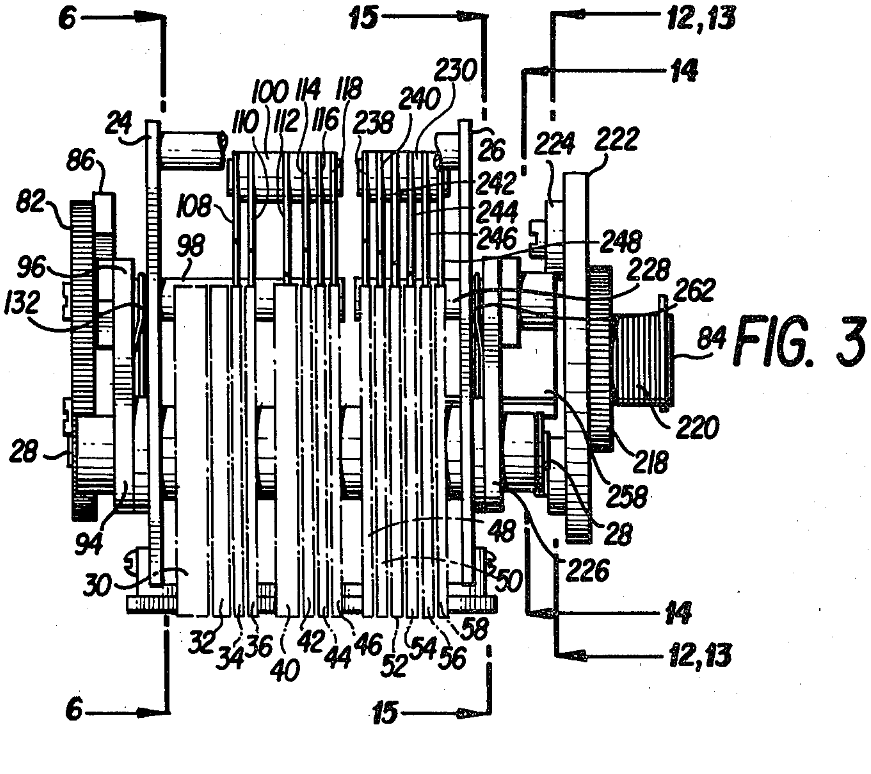
FIG. 3

PRINTING MECHANISM

DESCRIPTION

1. Technical Field

The present invention concerns imprinting mechanisms in which one or more character wheels are selectively rotated to position characters provided on their peripheries in a location appropriate for imprinting desired information. More particularly, the invention concerns such a mechanism which is adapted for use in machines for imprinting on a document both the date and time of receipt, and a serial number.

2. Background Art

In many business, professional and government offices, the volume of mail received makes it desirable to have a reliable device for marking each document with the date and time of receipt and, in many instances, a serial number. Machines which automatically stamp a document upon receipt have been in use for many years. In one popular variety of such machines, a number of character wheels is provided. On the peripheries of the wheels are located characters which can be positioned by rotating the wheels to form a line of characters for printing the desired information on a document. As the desired number of characters to be imprinted increases, the width of the stack of character wheels can become rather excessive. This is because in many prior art imprinting mechanisms, each character wheel is accompanied by an adjacent indexing or racheting wheel which cooperates with the character wheel and an associated indexing mechanism to move the character wheel to the desired position. Of course, the presence of the indexing or racheting wheel contributes to the mechanical complexity and overall width of the mechanism to a considerable extent. In cases where 20 or more characters per line are desired, such factors can have a negative effect on the manufacturing cost and commercial viability of the product. Thus, a need has existed for some time for an imprinting mechanism of the type using character wheels, in which a simplified mechanism for indexing the character wheels is provided whereby an increased number of characters per line may be printed without unduly increasing the overall size of the mechanism.

DISCLOSURE OF THE INVENTION

A primary object of the present invention is to provide an improved, simplified imprinting mechanism in which an increased number of characters can be printed on a given length of line.

Another object of the invention is to provide such a mechanism in which each character wheel embodies structure which facilitates its being indexed from character to character, without any need for an adjacent indexing or racheting wheel.

Still another object of the invention is to provide such a mechanism which is particularly well suited for use in a document imprinter which marks documents with a date and time of receipt, and serial number.

These objects of the invention are given only by way of example; thus, other desirable objectives and advantages inherently achieved by the disclosed structure may occur to those skilled in the art. Nonetheless, the scope of the invention is to be limited only by the appended claims.

In one embodiment of the invention, the improved imprinting mechanism includes a frame and a plurality of character wheels which are mounted for rotation about a shaft supported in the frame. Each character wheel includes a plurality of radially extending peripheral teeth, the outer surfaces of at least some of which are provided with characters to be imprinted. The teeth are separated by slots which extend radially toward the shaft and cooperate with an indexing rake having a plurality of fingers or tines each positioned for insertion into a slot in one of the character wheels. Rotating cams are provided for moving the rake sequentially so that its tines are first withdrawn from the slots in the character wheels, then moved around the character wheel to positions above other slots spaced along the circumference of the character wheels, then inserted in such other slots, after which the rake is returned to its initial position and the character wheel is rotated about its shaft.

So that some character wheels may remain stationary while others are rotated by the rake, the wheels each comprise at least one radially extending indexing slot of greater depth than the adjacent slots in that wheel, the depth of this deeper slot being different from wheel to wheel. Correspondingly, the tines of the indexing rake are of lengths proportional to the depth of the indexing slots in their associated character wheels so that when one tine is inserted into its associated indexing slot, another, shorter tine can be inserted into one of the slots in its associated character wheel, thereby causing two or more character wheels to be rotated when the rake returns to its initial position.

The indexing rake is moved by a linkage which comprises an arm pivotably mounted on the frame of the mechanism and a shaft affixed to the arm, the rake being pivotably mounted on the shaft. A rotating cam is driven so that it pivots the arm and the rake relative to each other and causes the tines of the rake to engage with and disengage from their associated character wheels. In the preferred embodiment, a spring biased pawl is provided which engages each character wheel to hold it in the position to which it is moved by the indexing rake.

When the mechanism according to the invention is used for imprinting a date and time of receipt, a synchronous motor is provided which drives a cam at one revolution per minute so that an indexing rake driven by the cam actuates its associated character wheel as necessary to indicate correct date and time of day. Other character wheels are provided for imprinting a serial number. The mechanism which actuates the platen of the machine to press a document into contact with the character wheels also rotates a further cam which actuates a further indexing rake associated with the character wheels used to imprint a serial number.

BRIEF DESCRIPTION OF THE DRAWINGS

FIG. 1 shows a perspective view of a document imprinter of the general type in which an imprinting mechanism according to the present invention is particularly useful.

FIG. 2 shows an example of a typical line of characters which can be imprinted using the imprinting mechanism according to the present invention.

FIG. 3 shows a front view of an imprinting mechanism according to the invention indicating the relative positions of the indexing rakes and character wheels.

BEST MODE FOR CARRYING OUT THE INVENTION

Figure 4A:
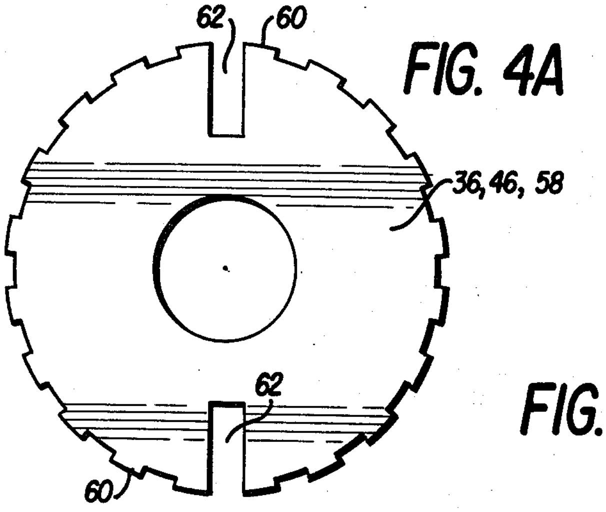
FIGS. 4A to 4D show plan views of character wheels of the type used in the imprinting mechanism according to the invention.
Figure 4B:
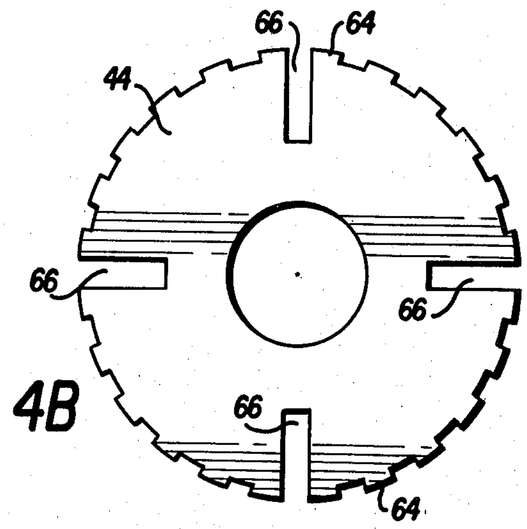

The following is a detailed description of a preferred embodiment of the invention, reference being made to the drawings in which like reference numerals identify like elements of structure in each of the several Figures.

FIG. 1 shows a perspective view of a document imprinter of the general type in which imprinting mechanisms according to the present invention may be used. Such an imprinter 10 is enclosed within a housing 12 having a removable base portion 14 and a removable upper portion 16. A document insertion slot 18 extends from the front of the machine between housing portions 14, 16. For convenience, a conventional clock 20 may be provided in the front face of the imprinter. In use, following the familiar procedure, a document 22 is inserted into slot 18 and imprinted with a line of data such as that shown in FIG. 2. Thus, the data may include the month, year and day on which the document is received, the time of its receipt in 12 or 24 hour format and a serial number of six or more digits. Of course, the sequence of the date, time and serial number information may be other than as shown, depending on the preference of the ultimate user.

FIG. 3 shows a front view of an imprinting mechanism of the type according to the invention as would be seen upon removal of the upper portion 16 of housing 12 so that the mechanism behind clock 20 is visible. The imprinting mechanism is supported in a frame comprising a pair of side plates 24, 26. An imprinting wheel shaft 28 is fixedly mounted between plates 24, 26. Rotatably mounted on shaft 28 are a plurality of character wheels 30–36 and 40–58. As illustrated, wheel 30 is a manually settable month wheel which includes 12 radially projecting, character bearing teeth, each having an abbreviation for a month of the year. Wheel 32 is a manually settable year wheel which includes a plurality of radially extending, character bearing teeth for several successive calendar years. Wheels 34, 36 are day wheels which are automatically settable by the imprinting mechanism according to the invention as are hour wheel 40, am/pm wheel 42, minute wheels 44, 46 and sequence or number wheels 48–58. If desired, hour wheel 40 and am/pm wheel 42 may be combined into a single character wheel.

Figure 4C:
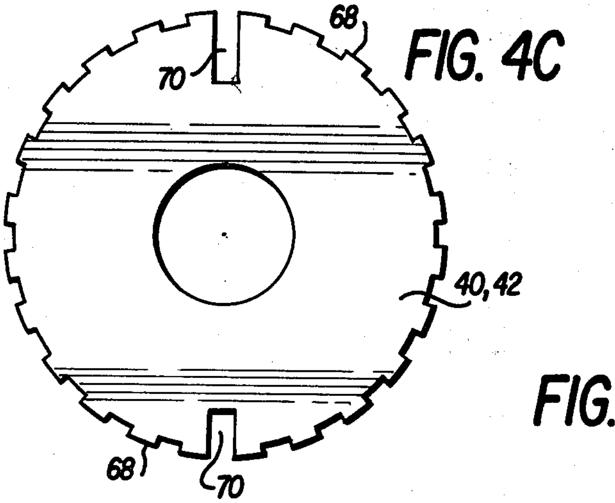
Figure 4D:
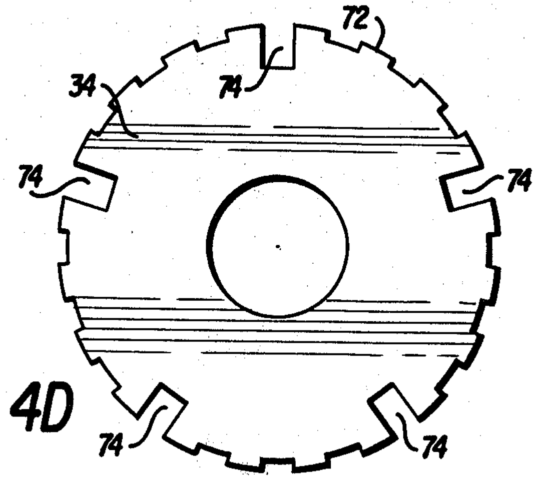

Referring now to FIGS. 4A to 4D, the various types of character wheels used in the imprinting mechanism may be understood. FIG. 4A shows a plan view of a typical day wheel 36, a minute wheel 46 and a sequence wheel 58, each of which comprises two sets of radially extending peripheral teeth 60, the outer surfaces of which are provided with digits or characters 0 to 9. The two sets are separated by two deep, radially extending index slots 62, the function of which will be described subsequently; and the individual teeth are separated by shallower slots of uniform depth. The 10 minute wheel 44 shown in FIG. 4B includes four sets of radially extending peripheral teeth 64, the outer surfaces of which are provided with digits or characters 0 to 5. The five sets are separated by four deep, radially extending index slots 66 and the individual slots are also separated by shallower slots. The hour wheel 40 shown in FIG. 4C includes two sets of radially extending peripheral teeth 68, the outer surfaces of which are provided with digits or characters 12, 1 to 11 (if a twelve hour format is used) or the digits or characters 0 to 11 and 12 to 23 (if a 24 hour format is used). These two sets of character teeth are separated by two am/pm index slots 70 of different depths, when a twelve hour format is used; or a single data index slot, when a twenty-four hour format is used. When hour wheel 40 is combined with am/pm wheel 42, only one index slot 70 is required. Wheel 42, if used, is a twenty-four hour tooth wheel having radially extending teeth, alternate ones of which are provided with the characters "am" and "pm" (not illustrated), and is otherwise identical to wheel 40. Day wheel 34 is shown in FIG. 4D and includes five sets of four radially extending peripheral teeth 72, the outer surfaces of which are provided with digits or characters 0 to 3, separated by five deep, radially extending index slots 74.

The date and time character wheels 34, 36 and 40–46 are actuated by one indexing mechanism and the sequencing character wheels 48–58 are actuated by a separate indexing mechanism, as will now be described. Referring simultaneously to FIGS. 5 to 9, the actuating mechanism for date and time character wheels 34, 36 and 40–46 may be understood. The output shaft 76 of a synchronous motor 78 (visible in FIG. 12) drives a precision gear 80 which, in turn, drives a second, idler gear 82 mounted for rotation on a shaft 84 which extends between side plates 24 and 26. A flat, single lobe cam 86 is attached to the back side of gear 82, as illustrated, and includes a flat leading edge 88 which extends essentially tangentially to the circumference of shaft 84. Edge 88 smoothly merges into a curved cam surface 90 which terminates at a flat trailing edge 92 extending sharply from surface 90 toward the center of shaft 84. Motor 78 preferably is designed to rotate at one revolution per minute, so that each revolution of gear 82 and cam 86 marks the passage of a minute by rocking an arm 94 which is pivotably mounted on imprinting wheel shaft 28.

Arm 94 supports near its outer end 96 a cantilevered, non-rotating shaft 98 on which are pivotably supported a date and time wheel indexing rake 100 and a rake lifting cam follower 102. Rake 100 comprises an arm 104 which may be assembled from several lamina as illustrated in FIG. 3. At the outer end 106 of arm 104 are provided a plurality of downwardly projecting indexing tines or fingers 108–118, each tine being positioned to fit into one or another of the slots in its associated wheel 34, 36 and 40–46. Cam follower 102 comprises a block 120 of essentially triangular cross section having a pair of upwardly extending pivot eyes 122 through which cantilevered shaft 98 passes. Only one of pivot eyes 122 is illustrated, particularly in FIG. 6; and it should be understood that a pivot eye is provided at each end of block 122. A flat lifting surface 124 on block 122 extends beneath the lower edge 126 of arm 104. A contact plate 128, preferably formed integrally with block 120, extends laterally from block 120 into the circular path of cam 86, just beneath the lower edge 130 of arm 94. Although follower 102 is illustrated as being a separate piece, those skilled in the mechanical arts will appreciate that it also could be formed integrally with arm 104 without departing from the scope of the present invention. Finally, in the illustrated embodiment, a spring 132 biases lifting surface 124 away from the lower edge 126 of arm 104 (FIGS. 3 and 5); and a spring 134 extends between the frame and shaft 98 to bias arm 94 in the counter-clockwise direction (FIG. 6).

Figure 7:
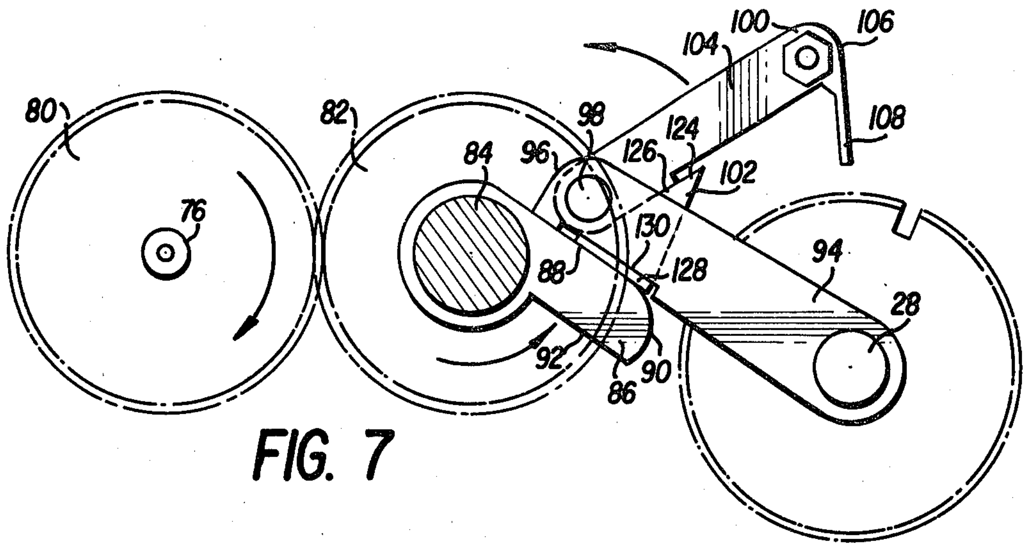
FIGS. 7, 8 and 9 show schematic views of the indexing mechanism used in the invention in positions assumed sequentially during its operation.
Figure 8:
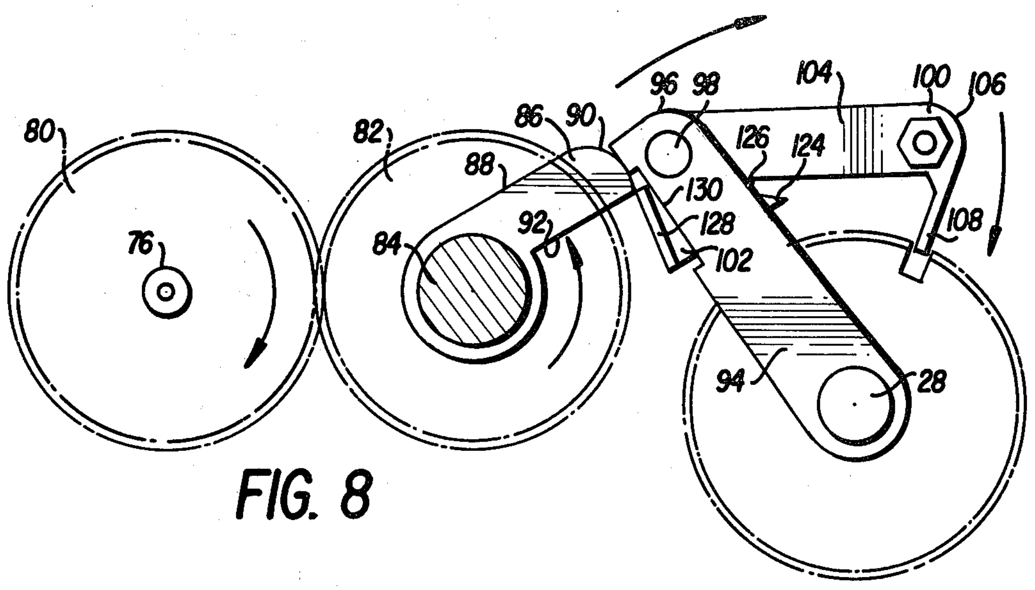
Figure 9:
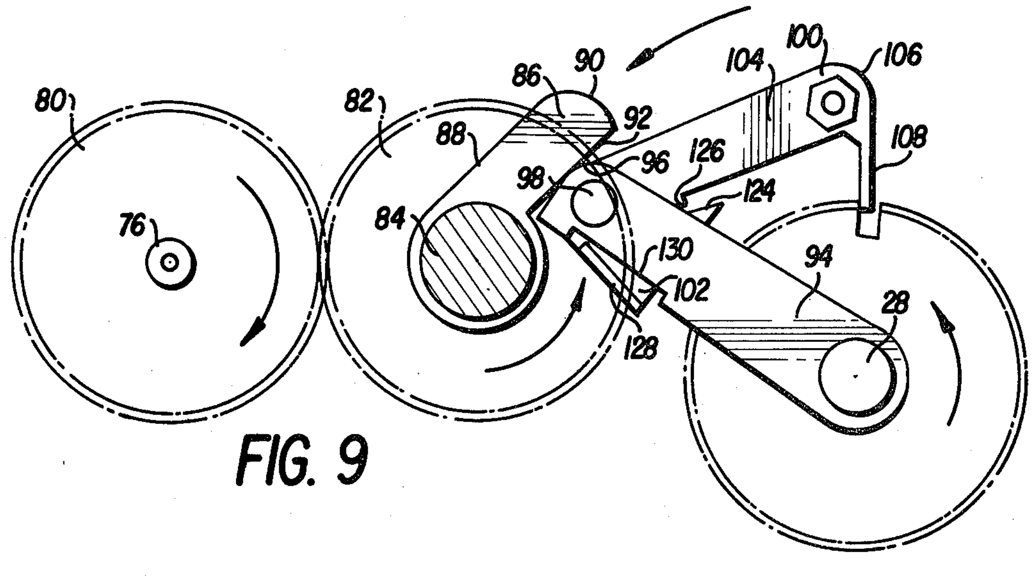

FIGS. 7 to 9 illustrate the sequence of operation of the imprinting mechanism according to the invention. Referring initially to FIG. 9, arm 94 and rake 100 are shown in their initial position at the beginning of a timing cycle when they have just been released by cam 86 and at least one of tines 108–118 extends into a slot in its associated character wheel. As cam 86 continues its counter-clockwise revolution with gear 82, it eventually contacts the bottom surface of contact plate 128 and lifts contact plate and block 120 to the position shown in FIG. 7. This movement causes arm 104 to rise to the position shown in FIG. 7, thereby withdrawing tines 108–118 to a position out of engagement with the slots in their associated character wheels. As cam 86 continues its revolution, curved surface 90 releases contact plate 128 and moves into contact with the trailing edge of arm 94. The moement of curved surface 90 along the underside of contact plate 128 causes arm 94 to rotate clockwise to the position shown in FIG. 8, thereby placing tines 108–118 above the next set of slots in their associated character wheels. When curved surface 90 moves out of contact with contact plate 128, tines 108–118 are permitted to drop so that one or more of them enter into the slots in their associated character wheels, as illustrated. Then, cam 86 continues its rotation until it releases arm 94 thus permitting the arm to rotate counter-clockwise under the influence of spring 134 to the position shown in FIG. 9, thereby indexing at least one of the character wheels by one tooth.

Referring again to FIG. 3, it will be seen that tines 108–118 are of different lengths, which correspond to, or are proportional to, the depths of the indexing slots in their associated character wheels. Thus, tine 118 which rotates the digit minute wheel 46 is the longest of the six, and its associated index slot is the deepest, since this wheel requires rotation upon each revolution of cam 86. That is, when tine 118 enters a slot, other than slot 62, between the teeth 60 illustrated in FIG. 4A, the adjacent tines 108–116 are prevented by their shorter lengths from entering any of the slots on their associated character wheels. However, when tine 118 drops into one of slots 62, the next longest tine 116 is permitted to enter one of the slots between teeth 64 illustrated in FIG. 4B. When tine 118 enters slot 62 and simultaneously tine 116 enters one of slots 66, then the next longest tine 112 will be permitted to enter one of the slots in its associated character wheel 40 as illustrated in FIG. 4C. When tines 118, 116 and 112 have entered, respectively, slots 62, 66 and 70, then tine 112 will be able to enter a slot in character wheel 42 to change its position from am to pm or vice versa. If the slot 70 entered by tine 112 is the deeper of the two slots 70, as illustrated, then tine 110 will also be permitted to enter one of the slots in its associated character wheel 36, as illustrated in FIG. 4A. Similarly, character wheel 34 will be indexed when tine 110 enters slot 62 of character wheel 36. The remaining character wheels 30 and 32 for the month and year are preferably manually settable, as previously indicated.

Once the character wheels 30–36 and 40–58 have been automatically or manually set to their proper positions, it is necessary to retain them in these positions during imprinting. For this purpose, a corresponding plurality of semirigid plastic or metal pawl plates 136 is provided, as illustrated in FIG. 6. Each of plates 136 comprises a downwardly opening U-shaped slot 138 through which shaft 84 extends and an upwardly extending integral leaf spring 140 which is flexed behind a spring retainer bar 142 extending between side plates 24, 26. The flexure of leaf spring 140 tends to rotate pawl plates 136 counter-clockwise, which is prevented by the engagement of a pawl finger 144 which extends downward and forward into position adjacent the character wheels and includes a circular tip 146 which extends partially into the slots between the teeth of the character wheels. Thus, pawl plates 136 permit counter-clockwise movement of the character wheels, as illustrated in FIG. 6, but prevent clockwise rotation.

Figure 10:
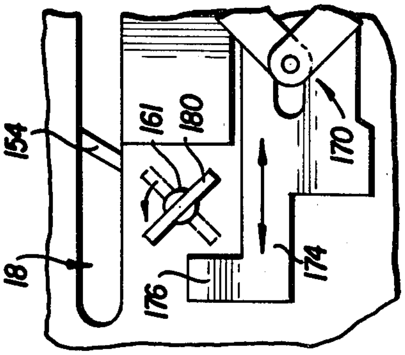
FIG. 10 shows a fragmentary view of a portion of the platen actuating mechanism not completely visible in FIG. 5.
Figure 5:
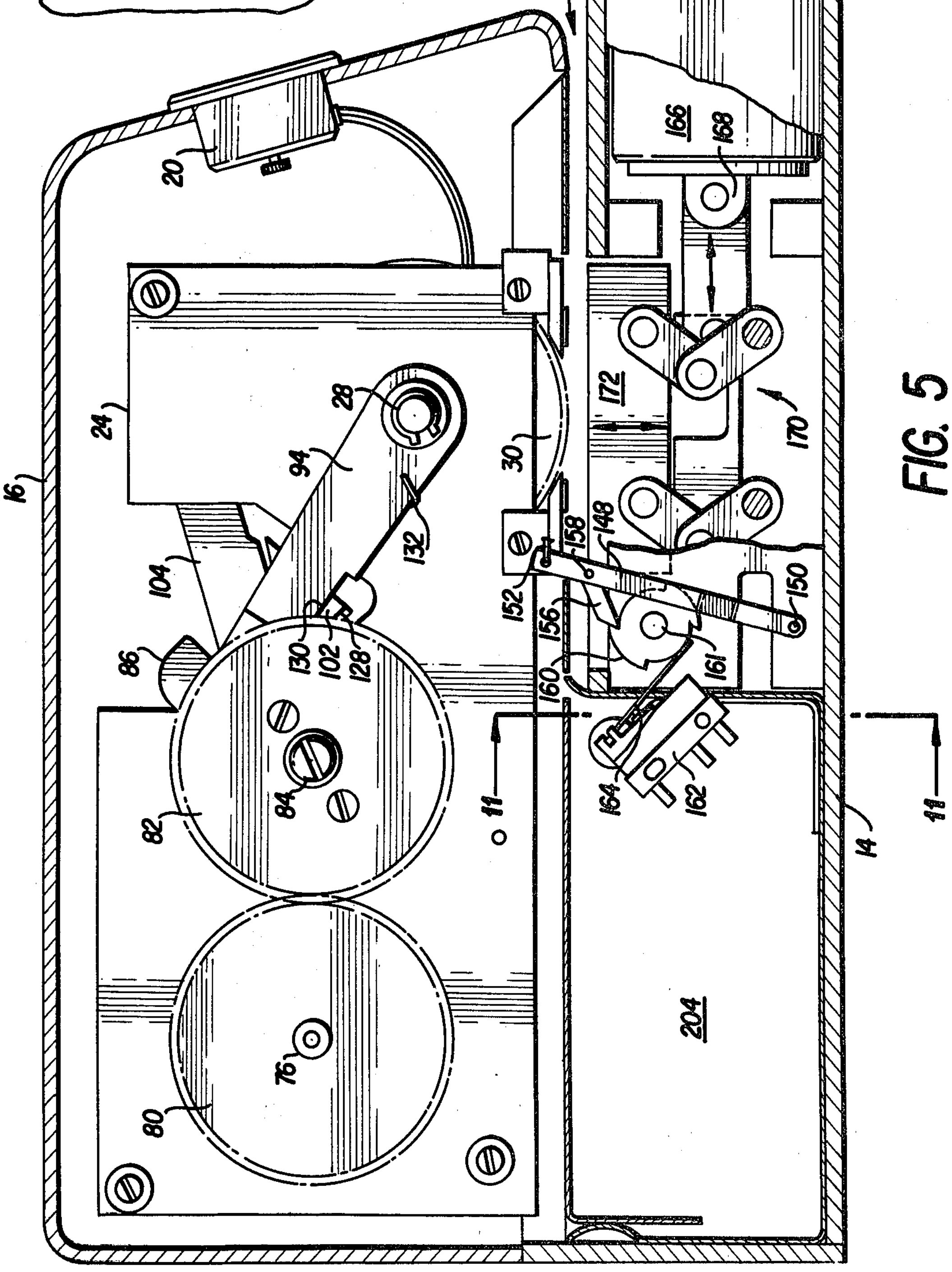
FIG. 5 shows an elevation view of the left side of an imprinting mechanism according to the invention taken along line 55 of FIG. 1, and also shows various features of the platen actuating mechanism.
Figure 6:
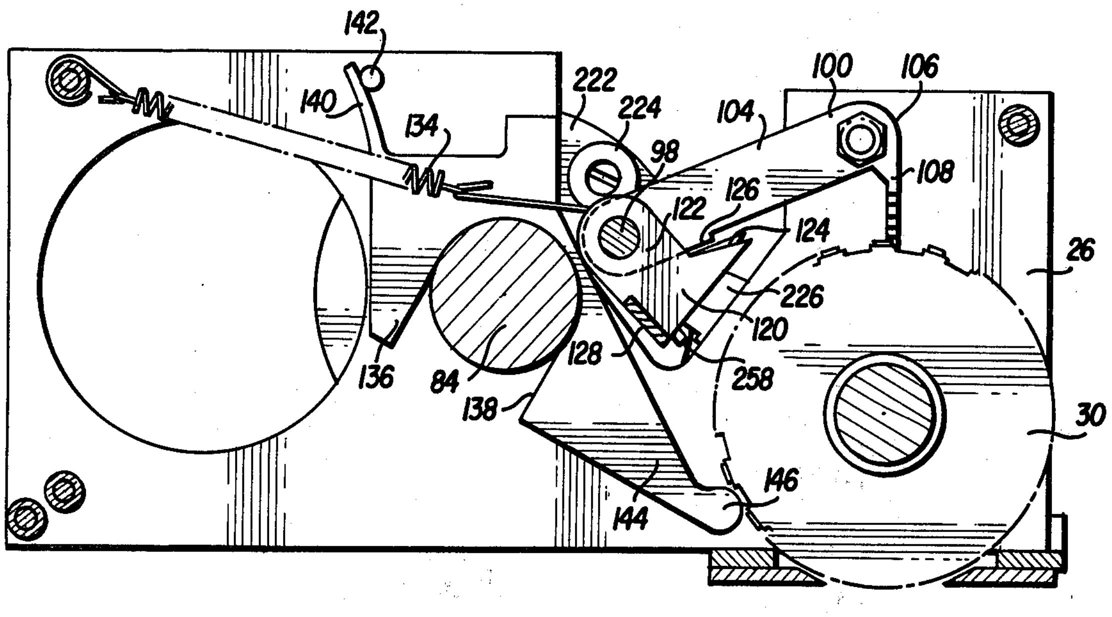
FIG. 6 shows a broken away view of the left side of the mechanism according to the invention, taken along line 6—6 of FIG. 3.
Figure 11:
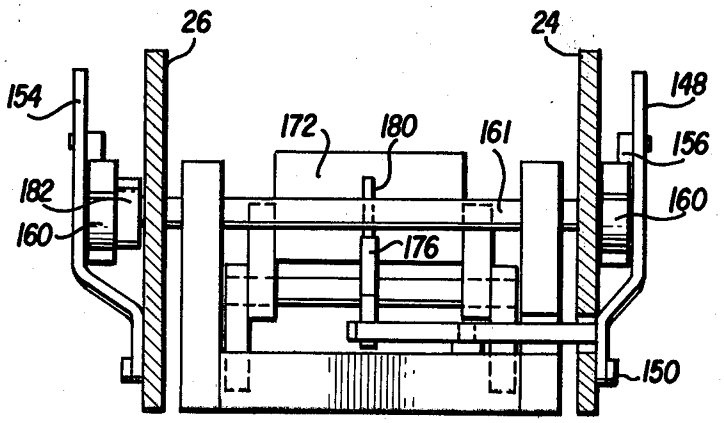
FIG. 11 shows a sectional view taken along line 11—11 in FIGS. 5 and 12.

The actuation of the serial number wheels 48–58 may be understood with reference to FIGS. 5 and 10 to 15. As shown in FIG. 5, a document inserted into slot 18 eventually contacts and moves a lever 148 which is pivoted at 150 to the frame of the mechanism and biased toward the front of slot 18 by a spring 152 (partially shown). A similar lever 154 is pivoted to the opposite side of the frame, as indicated partially in FIGS. 11 and 12. A pawl 156 is pivoted to lever 148 at pivot 158 and, as lever 148 is rotated toward the rear of slot 18 by a document, pawl 156 rotates a tow-lobe switch cam 160 which is mounted to rotate with a shaft 161 extending between side plates 24, 26, as seen in FIG. 11. As switch cam 160 rotates toward the back of the apparatus, one of its lobes closes a micro-switch 162 by depressing its resilient finger 164. Through an electrical circuit, not illustrated, current then flows to a solenoid 166 whose plunger 168 moves toward the front of the apparatus, as illustrated, thereby pulling a toggle mechanism 170 which raises a platen 172 from the position shown in FIG. 5 to the elevated position shown in FIG. 12 in which the character wheels are brought into contact with the document to imprint the desired information thereon.

Figure 12:
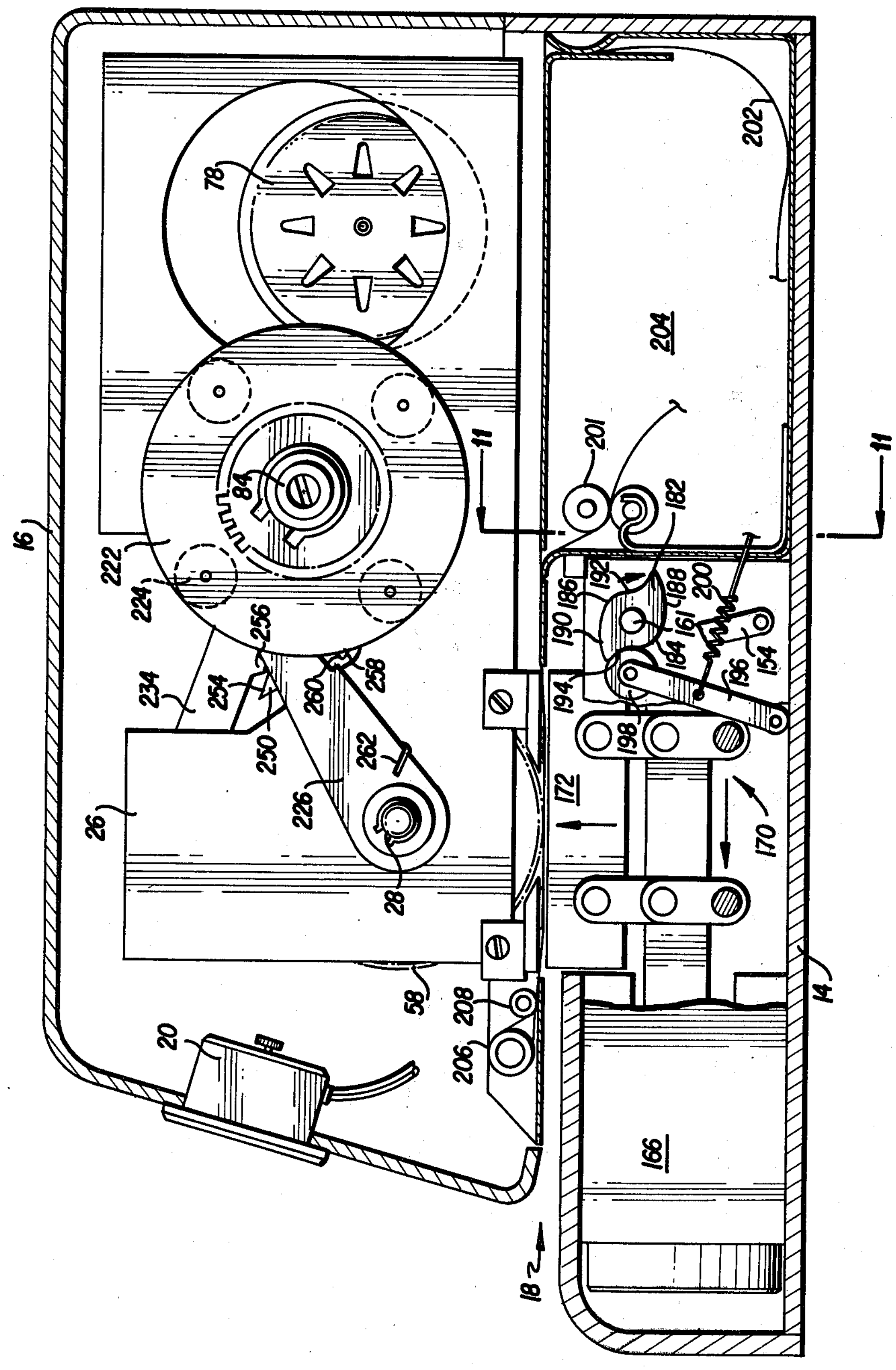
FIG. 12 shows an elevational view of the right side of a document imprinter embodying the present invention.

As seen in the fragmentary view of FIG. 10, the toggle mechanism 170 includes a rearwardly projecting arm 174 which includes an upwardly extending finger 176. Shaft 161 extending between plates 24, 26 as shown in FIG. 11, in turn carries a crank pin 180 which is rotated by movement of cam 160 to the phantom position shown in FIG. 10. Then, as solenoid 166 pulls toggle mechanism and finger 176 to the right, as illustrated, finger 176 contacts pin 120 and pulls shaft 161 further in the counter-clockwise direction. At the opposite end of shaft 161, as shown in FIGS. 11 and 12, a platen return cam 182 is mounted to rotate with shaft 161. Cam 182 includes a pair of diametrically opposed dwell surfaces 184, 186; a pair of increasing radius surfaces 188, 190; and a pair of decreasing radius surfaces 192, 194 separated by a sharp peak from surfaces 188, 190. A follower lever 196 carrying a roller 198 on its upper end is biased by a spring 200 so that as shaft 161 and cam 182 rotate, roller 198 moves along one of dwell surfaces 184, 186, up one of increasing radius surfaces 188, 190 and onto the peak preceding one of surfaces 192, 194. At this point, the force of spring 200 acts to pull roller 198 over the peak and onto one of surfaces 192, 194, thereby rotating shaft 161 and disengaging cam 160 from feeler 164 to de-energize solenoid 166. Thus, the platen 172 is returned to its lower position and the document may be withdrawn.

Although the mechanism for feeding the inking ribbon beneath the character wheels does not comprise a portion of the present invention, a brief indication of its function is included for completeness. Solenoid 166 also activates a ribbon feed mechanism (shown only partially) to drive rollers 201 which pull the ribbon 202 from its stuffing box 204, beneath the character wheels, past rollers 206, 208, again beneath the character wheels and then back to stuffing box 204.

Figure 15:
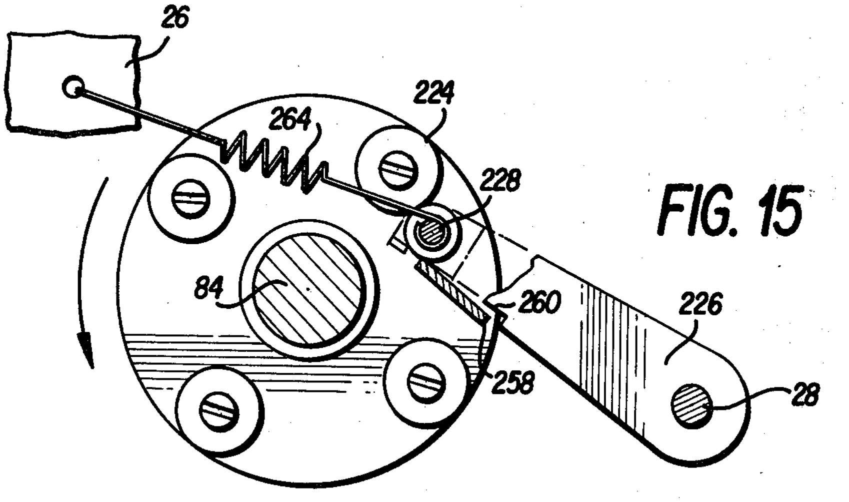
FIG. 15 shows a fragmentary sectional view taken along line 15—15 of FIG. 3.
Figure 14:
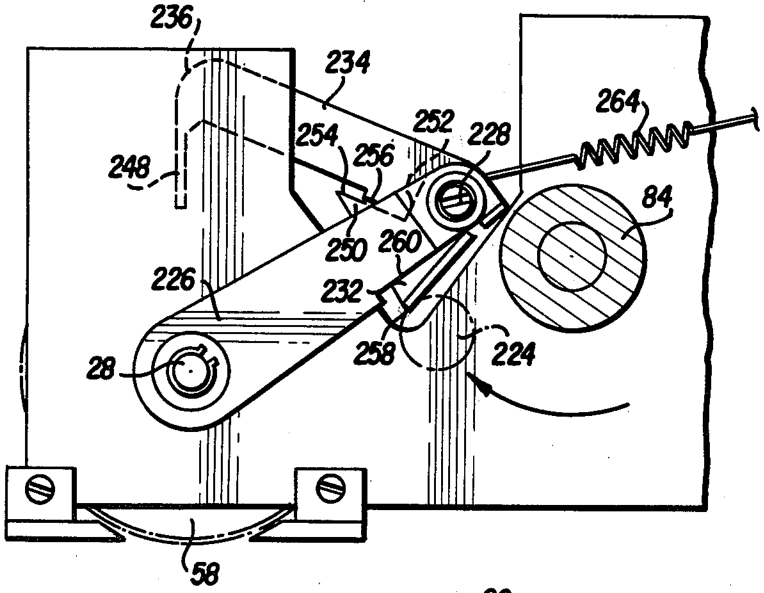
FIG. 14 shows an elevation view taken along line 14—14 5 of FIG. 3.
Figure 13:
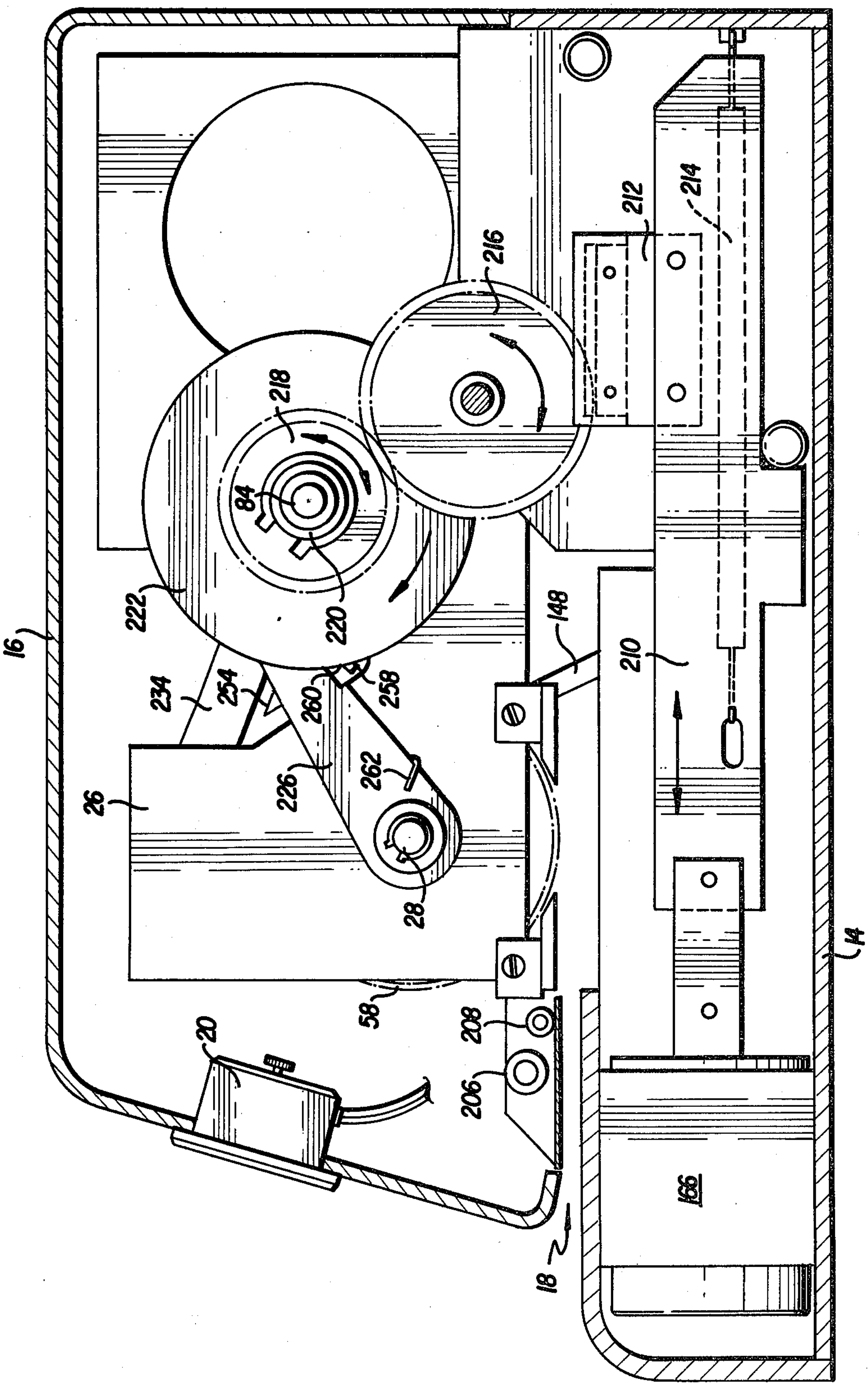
FIG. 13 shows another view of the right side of a document imprinter embodying the present invention, particularly indicating the mechanism which actuates the serial number character wheels.

Referring to FIGS. 13, 14 and 15, the mechanism for actuating the serial number character wheels may be understood. As solenoid 166 pulls its plunger toward the front of the apparatus, it simultaneously pulls a slider 210 on the upper edge of which is mounted a gear rack 212. Slider 210 is biased toward the back of the machine by means of a spring 214. Movement of gear rack 212 causes an idler gear 216 to rotate in engagement with a further gear 218 mounted on shaft 84. An overrunning clutch 220 is connected between gear 218 and a 4-lobed cam wheel 222 which is mounted for rotation on shaft 84. When solenoid 166 is deenergized, spring 214 pulls gear rack 212 to the back of the apparatus, causing idler gear 216 to rotate in the counter-clockwise direction which in turn causes gear 218 and cam wheel 222 to rotate in the clockwise direction. Since a 4-lobed cam wheel 222 is preferred, the length of rack 212 is chosen so that cam wheel 222 makes a quarter turn.

As shown in FIGS. 12, 14 and 15, cam wheel 222 includes four circular cam lobes 224 equally spaced about its circumference. Each time wheel 222 makes a quarter turn, one of these lobes 224 contacts and rocks an arm 226 which is pivotably mounted on shaft 28. Arm 226 supports near its outer end a cantilevered, nonrotating shaft 228 on which are pivotably supported a sequence wheel indexing rake 230 and a rake lifting cam follower 232. The structure and function of rake 230 and follower 232 are for all practical purposes identical to those of rake 100 and follower 102. Rake 230 comprises an arm 234 which also may be assembled from a plurality of lamina as shown in FIG. 3. At the outer end 236 of arm 234 is a plurality of downwardly projecting indexing tines or fingers 238–248 each tine being positioned to fit into one or another of the slots in its associated character wheel 48–58. Similarly, follower 232 comprises a block 250 of essentially triangular cross-section having a pair of upwardly extending pivot eyes 252, only one of which is illustrated, through which shaft 228 passes. Block 250 comprises an upper lifting surface 254 which extends beneath the lower edge 256 of arm 234 as shown in FIG. 14. An integral contact plate 258 extends laterally from block 250 into the path of cam lobes 224, just beneath the lower edge 260 of arm 226. A spring 262 biases surface 254 away from edge 256 and a spring 264 biases arm 226 in the counter-clockwise direction as viewed in FIG. 15. The sequence of operation of the mechanism for actuating character wheels 48, 58 is identical to that of the mechanism for actuating character wheels 34, 36 and 40–46.

INDUSTRIAL APPLICABILITY

Although the invention is disclosed for use in document imprinters, those skilled in the art will appreciate that it may be used in a wide variety of printing apparatuses in which character wheels are indexed in a desired sequence.

Having described our invention in sufficient detail to enable those skilled in the art to make and use it, we claim:

1. An improved imprinting mechanism, comprising:
 a frame;
 a first shaft supported in said frame;
 a plurality of character wheels mounted for rotation about said first shaft, each wheel comprising a plurality of radially outwardly extending peripheral teeth and plurality of radially outwardly extending characters to be imprinted, said teeth being separated by radially inwardly extending slots;
 an arm pivotably mounted on said frame, said arm having a trailing edge;
 a rotatable cam means mounted on said frame in position for rotating said arm;
 a second shaft affixed to said arm;
 an indexing rake pivotably mounted on said second shaft, said rake comprising a plurality of tines, each tine being for insertion into a slot between said teeth of said character wheels, said rake comprising a contact plate pivotable with said rake on said second shaft, said contact plate extending between said cam and said trailing edge, said contact plate being initially spaced from said trailing edge, said cam means initially contacting said plate to pivot said plate and said rake relative to said second shaft and thereby separate said tines from said slots, then pressing said plate against said trailing edge to move said arm and said tines along the circumference of said character wheels, then releasing said plate to insert at least one of said tines into at least one of said other slots and finally releasing said arm to allow said rake to return to its initial position, so that movement of said rake causes at least one of said character wheels to rotate about said first shaft to bring at least one new character into position for imprinting.

2. A mechanism according to claim 1, wherein said arm is pivotably mounted on said first shaft and said second shaft extends parallel to said first shaft.

3. A mechanism according to claim 1, wherein said cam means is rotated at one revolution per minute, whereby said character wheels may be used to imprint the time of day.

4. A mechanism according to claim 1, wherein said cam means is rotated by means responsive to the presence of a document to be imprinted by said mechanism, and at least a portion of said character wheels are provided with series of numbers to be imprinted, whereby successive documents may be numbered serially.

5. A mechanism according to claim 4, wherein said means responsive to the presence of a document comprises a switch triggered by insertion of a document for imprinting by said character wheels, a solenoid actuated by electrical current flowing through said switch, a gear rack connected to said solenoid and mounted for rectilinear movement in said frame, a return spring biasing said gear rack, an idler gear driven by said gear rack and mounted for rotation in said frame, and an overrunning clutch driven by said idler gear and attached to said rotating cam means, whereby when current to said solenoid is interrupted said rack returns, causing said idler gear and said clutch to rotate so that said cam means rotates and moves said arm to move said rake.

6. A mechanism according to claim 1, wherein said arm is resiliently biased toward said cam means.

7. A mechanism according to claim 1, wherein said contact plate is resiliently biased away from said trailing edge.

8. An improved imprinting mechanism, comprising:

a frame, a frist shaft supported in said frame;

a plurality of character wheels mounted for rotation about said first shaft, each wheel comprising a plurality of radially outwardly extending peripheral teeth, each of said teeth having a radially outermost surface and at least a portion of said teeth being provided on said outermost surfaces with characters to be imprinted, said teeth and said characters being separated by radially inwardly extending slots;

an arm pivotably mounted on said frame, said arm having a trailing edge;

a second shaft affixed to said arm;

rotatable cam means mounted on said frame in position for contacting said trailing edge to rotate said arm;

an indexing rake pivotably mounted on said second shaft, said rake comprising a plurality of tines, each tine being for insertion into a slot between said teeth and characters in one of said character wheels, said rake comprising a cam contact plate pivotable with said rake on said second shaft, said contact plate extending between said rotating cam means and said trailing edge, said contact plate being initially spaced from said trailing edge;

said cam means sequentially contacting said plate to pivot said plate and said rake relative to said arm and said shaft and thereby to withdraw said tines from engagement with any of a first plurality of said slots, then pressing said plate against said trailing edge to move said arm and said tines around the circumference of said character wheels from said first plurality, then releasing said plate to insert at least one of said tines into at least one of a further plurality of slots spaced along the circumference of said character wheels from said first plurality and finally releasing said arm to allow said rake to return to its initial position;

whereby movement of said tines causes at least one of said character wheels to rotate about said first shaft to bring at least one new character into position for imprinting.

9. A mechanism according to claim 8, wherein each one of at least a portion of said character wheels comprises at least one radially inwardly extending indexing slot of greater depth than the adjacent slots in that one wheel, the depth of said at least one indexing slot being different from wheel to wheel; each tine of said indexing rake being of a length corresponding to the depth of its associated at least one indexing slot, whereby when one tine is inserted into its associated at least one indexing slot, another shorter tine is inserted into a slot in its associated character wheel so that two or more character wheels are brought into position for imprinting.

10. A mechanism according to claim 8, wherein said arm is pivotably mounted on said first shaft and said second shaft extends parallel to said first shaft.

11. A mechanism according to claim 8, wherein said character wheels comprise characters for imprinting the date of the month, the time of the day and a serial number.

12. A mechanism according to claim 8, wherein said cam means is rotated at one revolution per minute, whereby said character wheels may be used to imprint the time of day.

13. A mechanism according to claim 8, further comprising pawl means for retaining each character wheel in position following actuation of said means for moving said rake.

14. A mechanism according to claim 13, wherein said pawl means comprises a plurality of plate elements mounted about a third shaft supported in said frame, there being one plate element for each character wheel, each plate element including a pawl finger having a tip extending adjacent to its associated character wheel in the direction of rotation thereof, said tip of each pawl finger engaging its associated character wheel.

15. A mechanism according to claim 8, wherein said cam means is rotated by means responsive to the presence of a document to be imprinted by said mechanism, and at least a portion of said character wheels are provided with series of numbers to be imprinted, whereby successive documents may be numbered serially.

16. A mechanism according to claim 15, wherein said means responsive to the presence of a document comprises a switch triggered by insertion of a document for imprinting by said character wheels, a solenoid actuated by electrical current flowing through said switch, a gear rack connected to said solenoid and mounted for rectilinear movement in said frame, a return spring biasing said gear rack, an idler gear driven by said gear rack and mounted for rotation in said frame, and an overrunning clutch driven by said idler gear and attached to said cam means, whereby when current to said solenoid is interrupted said rack returns, causing said idler gear and said clutch to rotate so that said cam means rotates and moves said arm to move said rake.

17. A mechanism according to claim 8, wherein said arm is resiliently biased toward said cam means.

18. A mechanism according to claim 8, wherein said contact plate is resiliently biased away from said trailing edge.

19. An imporived imprinting mechanism, comprising:

a frame;

a first shaft supported in said frame;

a plurality of character wheels mounted for rotation about said first shaft, each wheel comprising a plurality of radially outwardly extending peripheral teeth, each of said teeth having a radially outermost surface and at least a portion of said teeth being provided on said outermost surfaces with characters to be imprinted, said teeth and said characters being separated by radially inwardly extending slots;

an arm pivotably mounted on said frame, said arm having a trailing edge;

a second shaft affixed to said arm;

an indexing rake, said rake comprising a plurality of tines, each tine being for insertion into a slot between said teeth and characters in one of said wheels;

means mounted in said said frame for sequentially withdrawing said tines from engagement with any of a first plurality of said slots; for moving said tines around said character wheels to positions above a further plurality of slots spaced along the circumference of said character wheels from said first plurality; for inserting at least one of said tines into at least one of said further plurality of slots; and for returning said tines thereafter to their initial position, whereby movement of said tines causes at least one of said character wheels to rotate about said first shaft to bring at least one new character into position for imprinting, said means including rotatable cam means for pivoting said rake relative to said second shaft and for pivoting said arm relative to said frame; and means, responsive to the presence of a document to be imprinted by said mechanism, for rotating said cam means, said means for rotating comprising a switch triggered by insertion of a document for imprinting by said character wheels, a solenoid actuated by electrical current flowing through said switch, a gear rack connected to said solenoid and mounted for rectilinear movement in said frame, a return spring biasing said gear rack, an idler gear driven by said gear rack and mounted for rotation in said frame, and an overrunning clutch driven by said idler gear and attached to said cam means, whereby when current to said solenoid is interrupted said rack returns, causing said idler gear and said clutch to rotate so that said cam means rotates and moves said arm to move said rake.

* * * * *